(12) United States Patent　　　　(10) Patent No.: US 12,596,270 B2
Chi　　　　　　　　　　　　　　　　(45) Date of Patent:　　　Apr. 7, 2026

(54) EYEGLASS LENSES FOR VISION CORRECTION, AND GLASSES COMPRISING SAME

(71) Applicant: KOREA DESIGN SCIENCE INSTITUTE, Seoul (KR)

(72) Inventor: Min-Seo Chi, Seoul (KR)

(73) Assignee: KOREA DESIGN SCIENCE INSTITUTE, Seoul (KR)

( * ) Notice: Subject to any disclaimer, the term of this patent is extended or adjusted under 35 U.S.C. 154(b) by 609 days.

(21) Appl. No.: 17/917,204

(22) PCT Filed: Apr. 8, 2021

(86) PCT No.: PCT/KR2021/004391

§ 371 (c)(1),
(2) Date: Oct. 5, 2022

(87) PCT Pub. No.: WO2021/206461

PCT Pub. Date: Oct. 14, 2021

(65) Prior Publication Data

US 2023/0161181 A1　　　May 25, 2023

(30) Foreign Application Priority Data

Apr. 8, 2020　　(KR) ........................ 10-2020-0042510

(51) Int. Cl.
*G02C 7/16*　　　　　(2006.01)
*G02C 5/14*　　　　　(2006.01)

(52) U.S. Cl.
CPC ................ *G02C 7/16* (2013.01); *G02C 5/14* (2013.01); *G02C 2202/06* (2013.01); *G02C 2202/10* (2013.01)

(58) Field of Classification Search
CPC ........ G02C 7/16; G02C 5/14; G02C 2202/06; G02C 2202/10
See application file for complete search history.

(56) References Cited

U.S. PATENT DOCUMENTS

2009/0066907 A1 *　3/2009　Kopren .................... A61H 5/00
351/45
2009/0262299 A1 *　10/2009　Viktor ................... G02C 5/001
351/45

FOREIGN PATENT DOCUMENTS

| CN | 105511107 | 4/2016 | |
| CN | 110226118 | 9/2019 | |
| JP | 3050063 | 6/1998 | |
| JP | 3050063 U | * 6/1998 | ............... G02C 7/16 |

OTHER PUBLICATIONS

"Office Action for China Patent Application No. 202180027056.4, dated Mar. 21, 2025".

* cited by examiner

*Primary Examiner* — Tuyen Tra

(57) ABSTRACT

The present invention provides eyeglass lenses for vision correction, characterized in that transparent eyeglass lenses include lines which are provided on the eyeglass lenses, block a part of a user's field of view, and induce a holographic phenomenon in which the lines are placed in a space rather than a plane when the user sees a subject through the eyeglass lenses.

16 Claims, 6 Drawing Sheets

【FIGURE 1A】
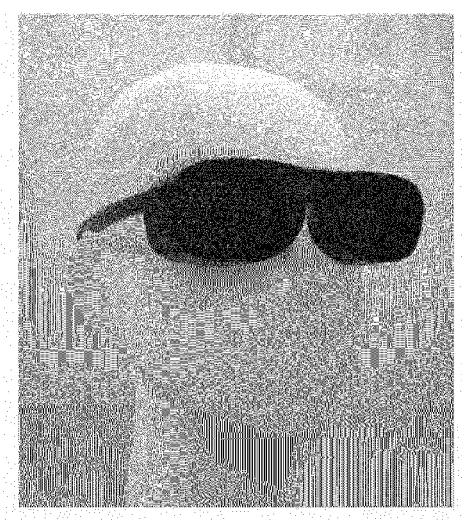
(a)
(b)
【FIGURE 1B】
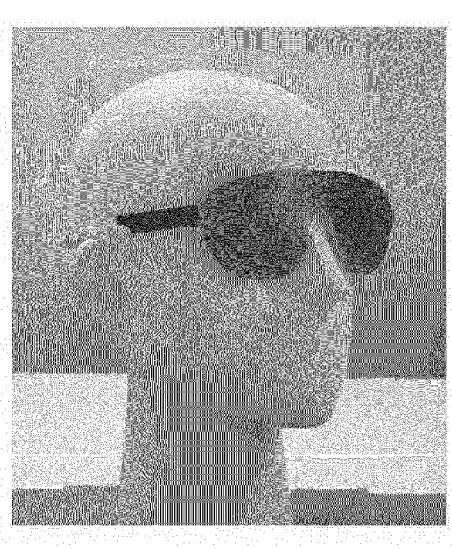
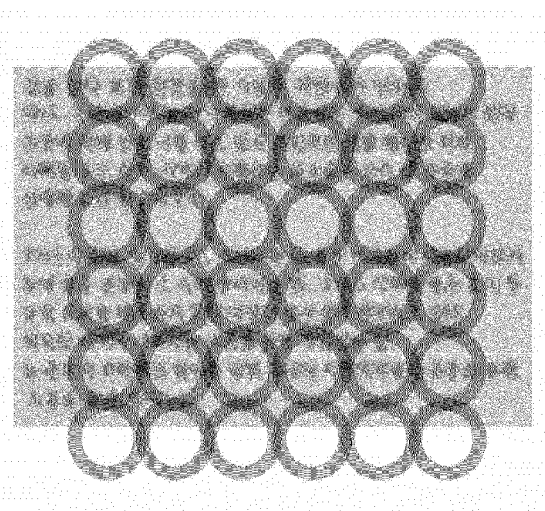
(a)
(b)

【FIGURE 2】
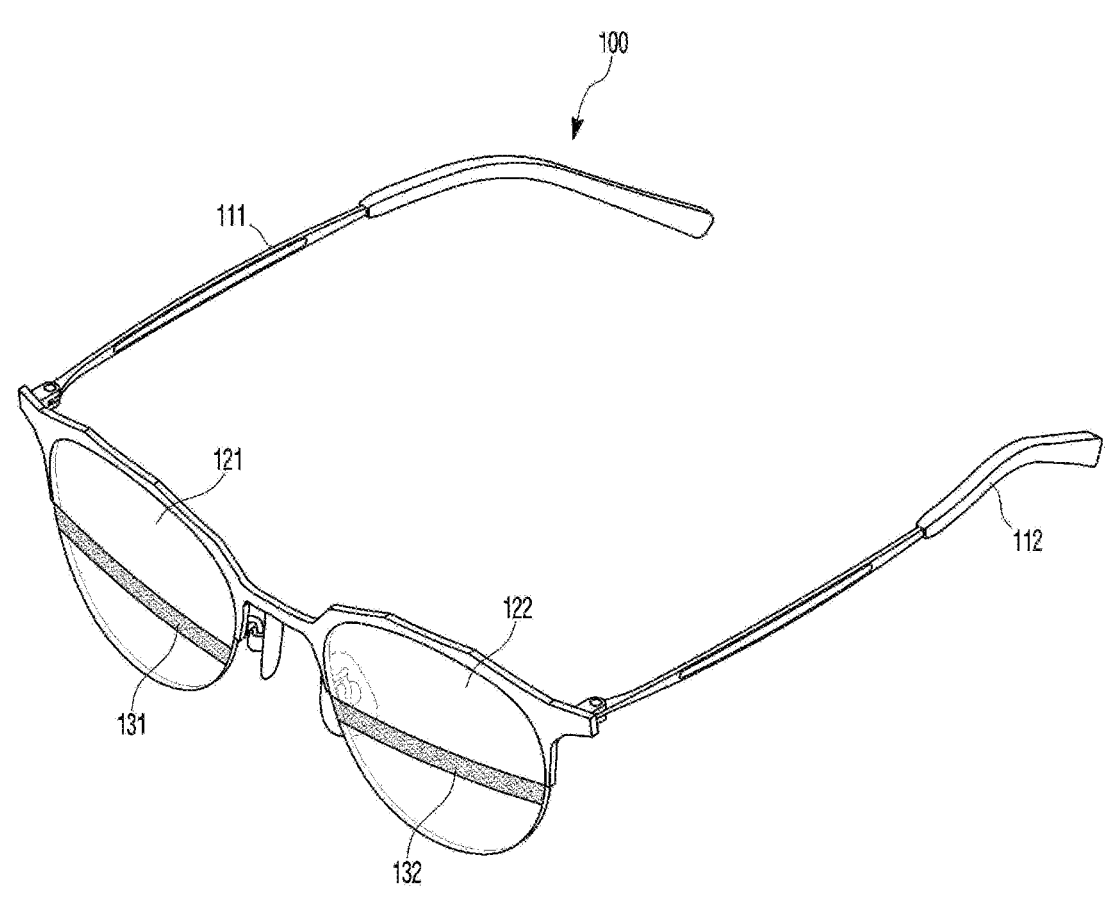

【FIGURE 3】
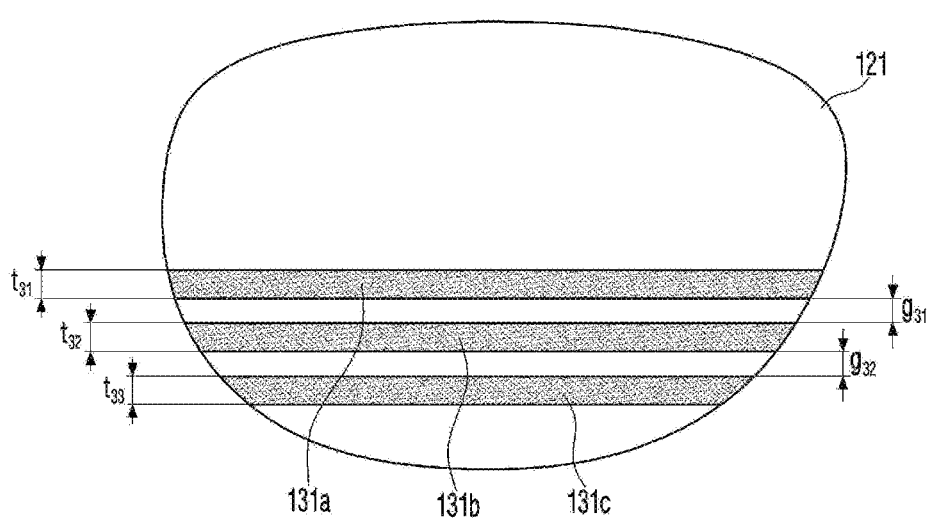
【FIGURE 4】
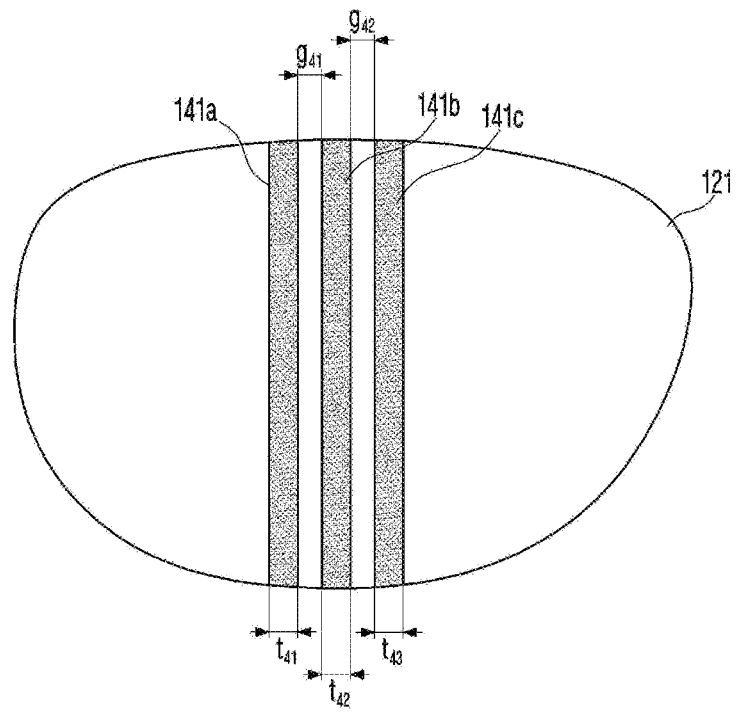

【FIGURE 5】
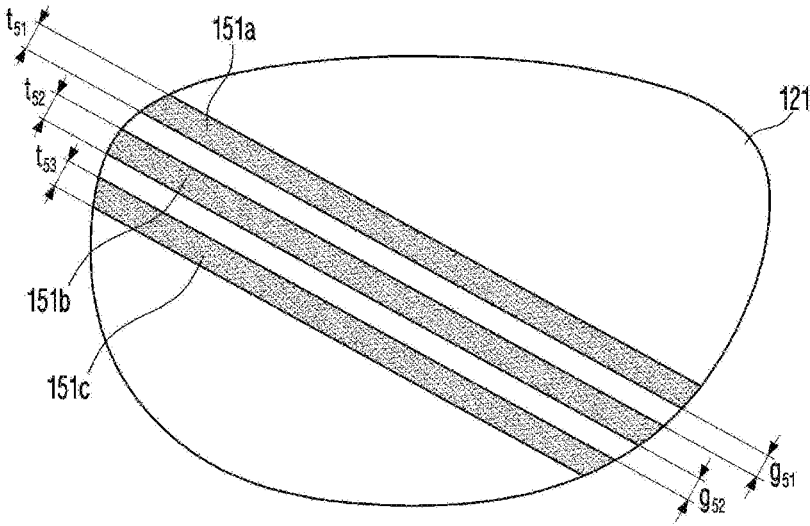
【FIGURE 6】
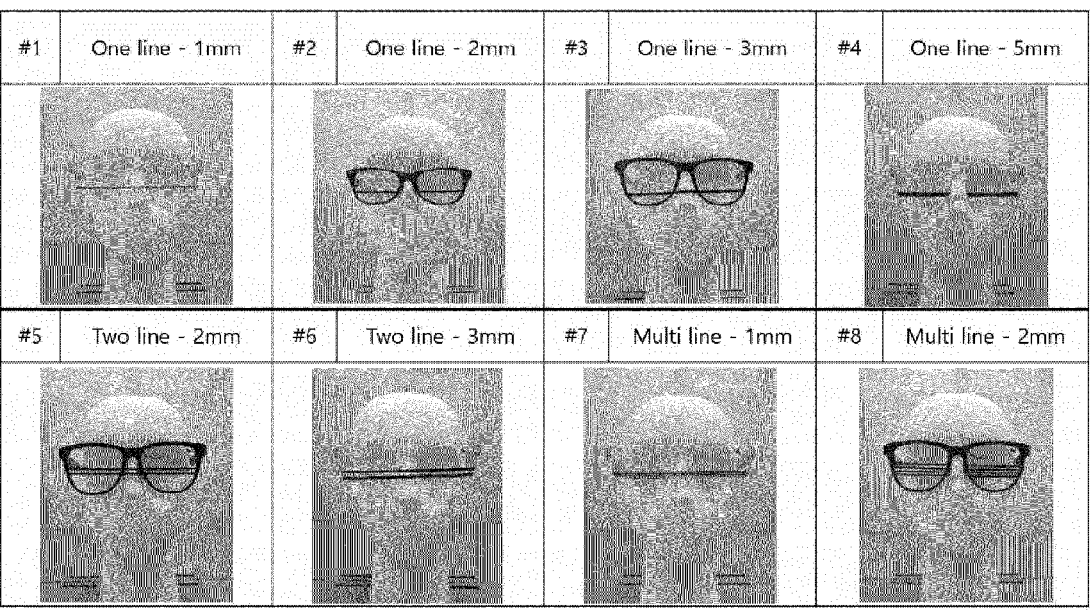

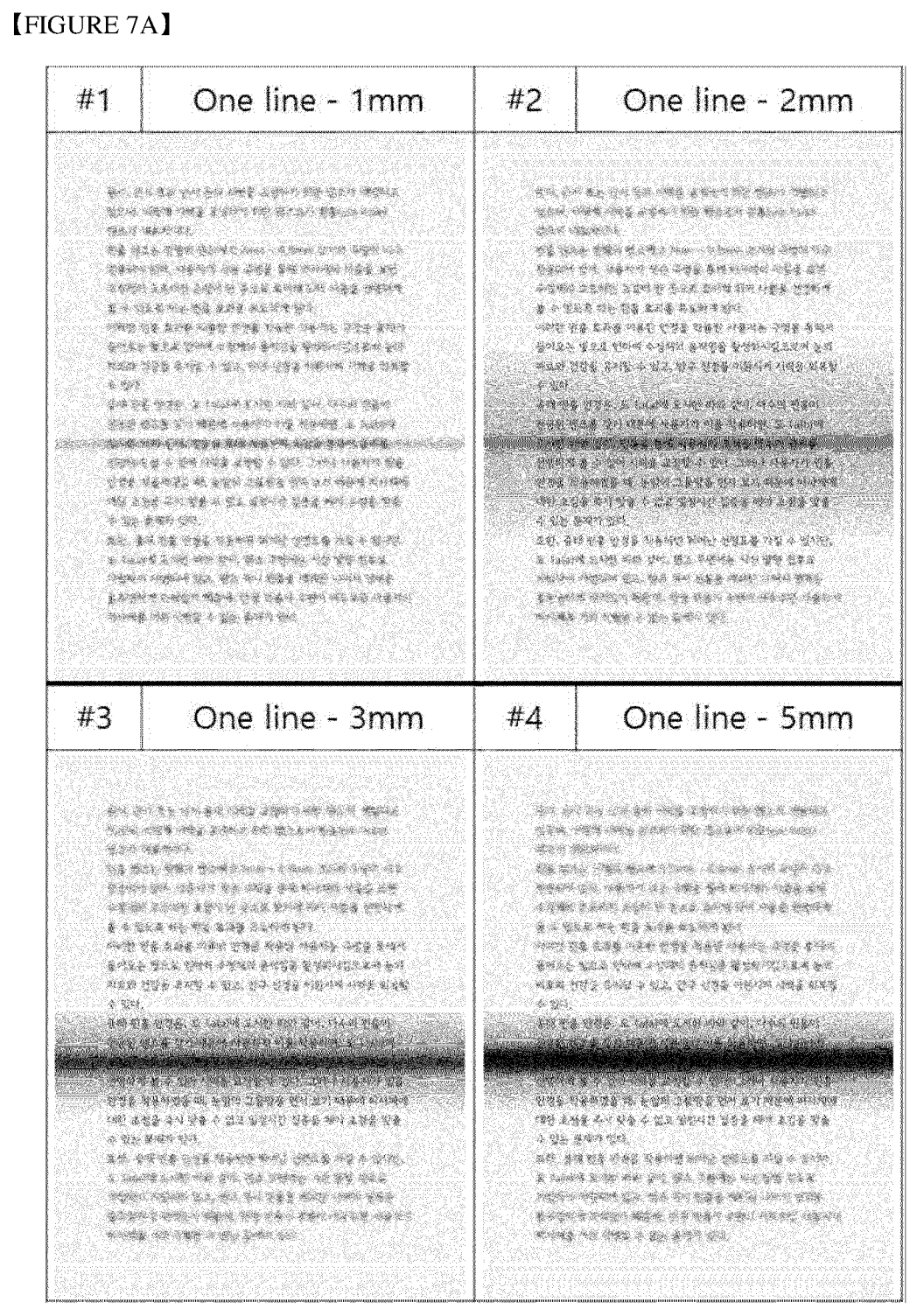

【FIGURE 7A】

| #1 | One line - 1mm | #2 | One line - 2mm |
|---|---|---|---|

| #3 | One line - 3mm | #4 | One line - 5mm |
|---|---|---|---|

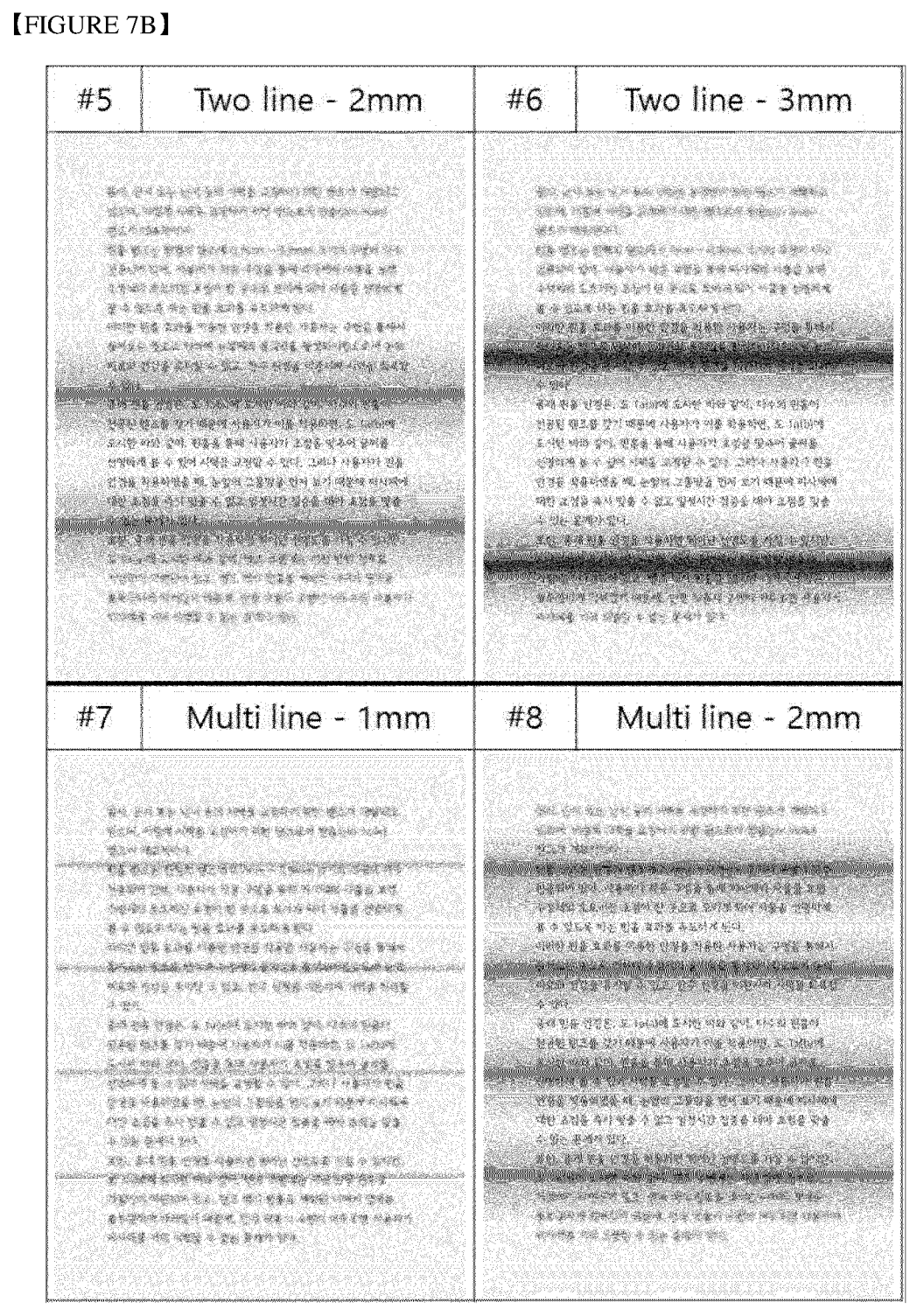

【FIGURE 7B】

EYEGLASS LENSES FOR VISION CORRECTION, AND GLASSES COMPRISING SAME

TECHNICAL FIELD

The present disclosure relates to an eyeglass lens for vision correction and eyeglasses including the same, which minimize the visual disturbance for a user wearing eyeglasses and have an excellent effect of vision correction.

BACKGROUND ART

Lenses for correcting visual acuity such as farsightedness, nearsightedness, or astigmatism have been developed. A pinhole lens is a representative lens for vision correction. A pinhole lens is a plate-shaped lens with a number of holes in the range of 0.7 mm to 0.9 mm. Thus, it provides a pinhole effect that allows a user to clearly see an object through the small holes by correcting the disordered focus of the lenses.

A user wearing eyeglasses having the pinhole effect may alleviate eye fatigue and maintain health by activating the movement of the lens through light transmitted through the holes, and may recover eyesight by relaxing the ocular nerve.

As shown in FIG. 1A-(a), conventional pinhole eyeglasses have perforated lenses with a plurality of pinholes. Accordingly, when the user wears the eyeglasses, the eyeglasses may help the user adjust the focus and clearly see the text through the pinholes, as shown in FIG. 1A-(b), thereby correcting the eyesight. However, when the user wears the pinhole eyeglasses, the focus on the subject cannot be immediately taken because the net structure in front of the eyes is seen to the user first. Thus, the user is required to concentrate for a certain period of time to take the focus.

In addition, although conventional pinhole eyeglasses may provide excellent visibility as shown in FIG. 1A-(a), a shield is provided around the lenses in the gaze direction, and the areas of the lenses except the pinholes are opaquely blocked. Accordingly, the user wearing the eyeglasses can hardly identify the subject when the surroundings are dark. As a result, the user may feel stuffy and thus cannot wear the pinhole eyeglasses for a long time.

Pinhole eyeglasses according to another example, shown in FIG. 1B-(a), have no shield around the lenses, and may thus relieve the frustration compared to the pinhole eyeglasses of FIG. 1A-(a). However, as shown in FIG. 1B-(b), the user cannot clearly see the text with the pinhole eyeglasses without the periphery thereof closed. As a result, such eyeglasses may not easily cause the user lenses to contract through the pinholes, and thus it may be difficult for the user to focus on the subject.

Therefore, the present disclosure is intended to provide lenses capable of vision correction by helping a user focus on a subject quickly without feeling stuffy unlike the conventional pinhole eyeglasses, and eyeglasses including the same.

DISCLOSURE

Technical Problem

Therefore, the present disclosure has been made in view of the above problems, and it is one object of the present disclosure to provide eyeglass lenses for vision correction capable of correcting the vision of a user wearing eyeglasses and minimizing the visual disturbance for the user unlike conventional pinhole eyeglasses, and eyeglasses including the same.

Technical Solution

In accordance with one aspect of the present disclosure, provided is a transparent eyeglass lens for vision, including a line provided on the eyeglass lens to block a part of a user's field of view, wherein, when the user sees a subject through the eyeglass lens, a hologram effect causing the line to be seen to be placed in a space rather than in a plane is induced.

According to an embodiment, the line may include at least one line arranged in a horizontal direction.

According to an embodiment, the line arranged in the horizontal direction may be formed to correspond to a slope formed by pupils of both eyes of the user facing forward.

According to an embodiment, the line may include two or more lines, wherein a sharp focus section of the user may be formed between a highest line and a lowest line among the lines.

According to an embodiment, a width of the line may be 1.5 mm to 4 mm.

According to an embodiment, a width of each of the lines may be 1.5 mm to 4 mm, wherein a distance between two adjacent lines among the lines may be 1.5 mm to 3 mm.

According to an embodiment, the line may include at least one line vertically arranged on the eyeglass lens.

According to an embodiment, the line may include at least one line diagonally arranged on the eyeglass lens.

According to an embodiment, the line may be any one line selected from a group consisting of at least one horizontal line, at least one vertical line, and at least one diagonal line formed on the eyeglass lens, or a combination thereof.

In accordance with another aspect of the present disclosure, provided are eyeglasses may include the eyeglass lens, and a temple coupled to the eyeglass lens and formed so as to be draped over a user's ear.

Advantageous Effects

The eyeglass lenses for vision correction and eyeglasses including the same according to the present disclosure may provide an eye correction effect related to presbyopia or astigmatism for a user wearing the eyeglasses, while minimizing visual disturbance for the user by employing transparent eyeglass lenses.

Furthermore, even when the surrounding environment is dark, the user may obtain a vision correction effect by wearing the eyeglass lenses for vision correction and eyeglasses including the same according to the present disclosure.

DESCRIPTION OF DRAWINGS

FIGS. 1A-(a) and 1A-(b) show an exterior of a pinhole eyeglasses according to an embodiment in the related art and an object seen to a user wearing the same, respectively.

FIGS. 1B-(a) and 1B-(b) show an exterior of a pinhole eyeglasses according to another embodiment in the related art and an object seen to a user wearing the same, respectively.

FIG. 2 is a view showing an exterior of eyeglasses including lenses for vision correction according to an embodiment of the present disclosure.

FIG. 3 is a view showing a lens for vision correction according to an embodiment of the present disclosure.

FIGS. 4 and 5 are views showing a lens for vision correction according to another embodiment of the present disclosure.

FIG. 6 shows various experimental examples of lenses for vision correction according to an embodiment of the present disclosure.

FIGS. 7A and 7B show experimental results according to the experimental examples of FIG. 6.

BEST MODE

Hereinafter, the present disclosure will be described in detail by explaining exemplary embodiments of the present disclosure with reference to the attached drawings. The same reference numerals in the drawings denote like elements, and a redundant description thereof will be skipped. As used herein, the suffixes "unit" and "part" are added or used interchangeably to facilitate preparation of this specification and are not intended to suggest distinct meanings or functions. In the following description of the embodiments of the present disclosure, a detailed description of known technology will be omitted to avoid obscuring the subject matter of the present disclosure. The accompanying drawings are intended to facilitate understanding of the embodiments disclosed herein, and should not be construed as including all modifications, equivalents and substitutes included within the spirit and scope of the present disclosure.

It will be understood that, although the terms "first," "second," "third," etc. may be used herein to describe various elements, the elements should not be limited by these terms.

These terms are only used to distinguish one element from another element.

It will be understood that when an element is referred to as being "on", "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

A singular expression includes a plural expression unless the context clearly dictates otherwise.

In this specification, the term "include" or "have" is intended to indicate that characteristics, figures, steps, operations, constituents, and components disclosed in the specification or combinations thereof exist. The term "include" or "have" should be understood as not pre-excluding possibility of existence or addition of one or more other characteristics, figures, steps, operations, constituents, components, or combinations thereof.

FIG. 2 is a view showing an exterior of eyeglasses including lenses for vision correction according to an embodiment of the present disclosure.

As shown in FIG. 2, eyeglasses 100 according to an embodiment of the present disclosure may include a pair of eyeglass lenses 121 and 122 and temples 111 and 112 coupled to the eyeglass lenses 121 and 122 to be draped over the user's ears. The temples 111 and 112 may be hinge-coupled to the eyeglass lenses 121 and 122 such that the temples 111 and 112 may be folded onto the eyeglass lenses 121 and 122.

According to an embodiment, the eyeglass lenses 121 and 122 may be mounted in a frame. In this case, the temples 111 and 112 may be hinge-coupled to the frame.

In addition, the eyeglass lenses 121 and 122 or the frame may be provided with a nose support so as to be seated on the user's nose.

In contrast with conventional pinhole lenses, the eyeglass lenses 121 and 122 according to the embodiment of the present disclosure may be formed of a transparent material allowing light to be transmitted therethrough, thereby minimizing the blocking area of the user's field of view and relieving the frustration caused by the conventional pinhole eyeglasses.

In addition, as the eyeglass lenses 121 and 122 according to the embodiment of the present disclosure are formed of a transparent material, they may secure a wide field of view. Accordingly, the glasses may be used even in a dark environment.

At least one line 131 and 132 having a predetermined thickness may be provided on the eyeglass lenses 121 and 122 formed of a transparent material. Stripe 131 and 132 are provided on the eyeglass lenses 121 and 122 to block part of the user's view of a subject seen through the eyeglass lenses 121 and 122. When the user sees the subject through the eyeglass lenses 121 and 122, a hologram effect may be induced such that the lines 131 and 132 are placed in a space other than a plane.

That is, as shown in FIGS. 7A and 7B, when the user sees the subject through the eyeglass lenses 121 and 122 according to the embodiment of the present disclosure, the lines 131 and 132 on the eyeglass lenses 121 and 122 may appear floating in the space like a hologram, but the area around the eyeglass lenses 121 and 122 may be seen blurred. In addition, on the subject to be focused through the eyeglass lenses 121 and 122, the areas around the positions of the lines 131 and 132 are clearly seen.

The lines 131 and 132 are not particularly limited as long as they are intended to block a part of the field of view of the eyeglasses 121 and 122. For example, a detachable film or tape may be used, or a member with a predetermined rigidity may be coupled to the eyeglasses or the frame.

In addition, the lines 131 and 132 are not particularly limited in shape, and may have a straight line shape, and the color thereof may be dark with low chroma, preferably black.

According to an embodiment of the present disclosure, at least one of the lines 131 and 132 may be formed horizontally on the eyeglass lenses 121 and 122. At least one line 131, 132 with a predetermined thickness $t_{31}$ to $t_{33}$ may be provided. When a plurality of lines 131$a$ to 131$c$ is provided, the lines may be arranged spaced apart from each other by a predetermined distance $g_{31}$ to $g_{32}$.

In this case, when the lines 131 and 132 are formed horizontally, the arrangement thereof may correspond to the horizontal direction of the eyeglasses 100. According to a preferred embodiment, the lines 131 and 132 may be formed horizontally to correspond to a slope formed by the height of the two pupils of the user facing forward.

In addition, the positions (or heights) of the lines 131 and 132 provided on the eyeglass lenses 121 and 122 are not particularly limited. Since the user usually requires a clear view of the letters on the floor, the lines may be positioned slightly downward from the middle height of the eyeglasses 121 and 122.

The lines 131 and 132 formed horizontally preferably have a width ($t_{31}$ to $t_{33}$) of 1.5 mm to 4 mm, more preferably 1.5 mm to 2 mm. When the width exceeds 2 mm, there is no significant difference from the case where the width of a part of the line that appears to be floating is 2 mm. Further, when the thickness is greater than or 3 mm, the lines may block the view of the subject.

The horizontal lines 131 and 132 may be plural, preferably 2 to 4. When the eyeglass lenses 121 and 122 having the plurality of lines 131*a* to 131*c* are used, the user may clearly see the area of the subject between the top line 131*a* and the bottom strip 131*c* among the lines 131*a* to 131*c*. Accordingly, the two lines 131 and 132 are preferably grouped and spaced apart from each other by a predetermined distance $g_{31}$ to $g_{32}$. Here, the distance $g_{31}$ to $g_{32}$ between the two neighboring lines 131 and 132 is preferably 1.5 mm to 3 mm, more preferably 1.5 mm to 2 mm.

According to another embodiment of the present disclosure, as shown in FIG. 4, at least one line 131 and 132 having the above-described specifications (width ($t_{41}$ to $t_{43}$), number, distance ($g_{41}$ to $g_{42}$), etc.) may be vertically formed.

The lines 131 and 132 may be formed vertically because text, which is generally arranged horizontally, can be arranged vertically depending on the country or culture in many cases.

In addition, as illustrated in FIG. 5, according to various shapes of the subject, at least one line 131, 132 with the above-described specifications (width ($t_{51}$ to $t_{53}$), number, and ($g_{51}$ to $g_{52}$) may be diagonal. Two or more lines selected from among the horizontal lines 131*a* to 131*c*, vertical lines 141*a* to 141*c*, and diagonal lines 151*a* to 151*c* may be combined to form various patterns.

Experimental Example 1

FIG. 6 shows various experimental examples of lenses for vision correction according to an embodiment of the present disclosure. In the experiment, a horizontal line of various widths was provided, and 7-point printed letters located 30 cm to 40 cm in front of the eyeglasses were shown to men and women in their 50s and 60s in Seoul, and a five-point scale method was used for sharpness and readability. The higher the sharpness and the higher the readability, the higher the score was evaluated. The results are shown in Table 1 below with the opinions.

TABLE 1

| Object | Specification | Experimental Opinion | Score | Total Score |
|---|---|---|---|---|
| #1 | No. of lines: 1 Width: 1 mm | Focusing is not good. The width of the line is thin as 1 mm, and the black hologram effect line is blurred, so the eye reduction effect is weak. | Sharpness: 1 Readability: 0 | 1 |
| #2 | No. of lines: 1 Width: 2 mm | About 30 mm vertical section above and below the line. the focus is clear. The line does not cover letters, so text above and below the line can be read at the same time. | Sharpness: 4 Readability: 3 | 7 |
| #3 | No. of lines: 1 Width: 3 mm | About 15 mm vertical section above and below the line. The focus is clear. The line covers letters, so text can only be read in one direction at the top and bottom of the line. | Sharpness: 3 Readability: 2 | 5 |
| #4 | No. of lines: 1 Width: 5 mm | About 15 mm vertical section above and below the line. The focus is clear. The line covers letters, so text can only be read in one direction at the top and bottom. The black line completely covers the letters. | Sharpness: 3 Readability: 1 | 4 |

Experimental Example 2

Unlike Experimental Example 1, two horizontal lines of various widths were prepared, and the experimental results for the same object are shown in Table 2 below with the opinions.

TABLE 2

| Object | Specification | Experimental Opinion | Score | Total Score |
|---|---|---|---|---|
| #5 | No. of lines: 2 Width: 2 mm Distance: 2 mm | About 40 mm section between the two lines. Sharp focus. The text in the space between the lines is clearly visible. The clear range is wider and the text is easier to read than when only one line is provided. | Sharpness: 4 Readability: 4 | 8 |
| #6 | No. of lines: 2 Width: 3 mm Distance: 3 mm | About 50 mm section between the two lines. Partially clear. The text in the space between the lines is clearly visible. The clear range is wider than when only one line is provided. However, the middle part of the range is blurry. The black lines partially cover the text. | Sharpness: 3 Readability: 2 | 5 |

For object #6, when the distance between the two lines is 2 mm, there is no blurry part in the middle, the optimal distance between the lines is preferably less than 3 mm.

Experimental Example 3

Unlike Experimental Example 1 or 2, four horizontal lines of various widths were provided, and the experimental results for the same object are shown in Table 3 below with the opinions.

TABLE 3

| Target | Specification | Experimental Opinion | Score | Total Score |
|---|---|---|---|---|
| #7 | No. of lines: 4 Width: 1 mm Distance: 2 mm | Poor focus. Due to the thin line of 1 mm width, the black line hologram area is not formed, and the sharpness improvement effect is insignificant. | Sharpness: 1 Readability: 0 | 1 |
| #8 | No. of lines: 4 Width: 2 mm Distance: 2 mm | The area where the text is clear appears to be the widest. Focusing is somewhat more inconvenient than when one or two lines are provided | Sharpness: 3 Readability: 5 | 8 |

In the case of object #8, the readability is high when a large area is seen at the same time. However, when the user concentrates on one part as in reading, the concentration is distracted compared to the case when two lines are provided, and the sharpness is slightly lower than in the case of object #6.

in the above experimental examples, when a subject located at a reading distance of 30 cm to 40 cm was seen, the sharpness was increased and the effect of vision correction for presbyopia were obtained. However, when a subject located at a long distance was seen, the clarity of the view of the subject was somewhat low. Thus, the eyeglasses may be suitable for short distance.

While present disclosure has been particularly shown and described with reference to exemplary embodiments thereof, it will be understood by those skilled in the art that various changes in form and details may be made herein without departing from the spirit and scope of the present disclosure as defined by the appended claims.

Accordingly, the scope of the present disclosure is to be defined by the claims below rather than the detailed description, and all changes or modifications derived from the meaning, scope, and equivalent concept of the claims are included in the scope of the present disclosure.

The invention claimed is:

1. A transparent eyeglass lens for vision, comprising: one or more continuous straight lines provided on the eyeglass lens to block a part of a user's field of view, wherein, when the user sees a subject through the eyeglass lens, a hologram effect causing the line to be seen to be placed in a space rather than in a plane is induced,
wherein each continuous straight line has a blurred appearance;
wherein the eyeglass lens creates the user's visual focus area directly adjacent to each straight line such that the image within the focus area appears more prominent than the image underneath the blurred straight line when the user is in a position to read a text or recognize an image with the transparent eyeglass lens;

wherein the visual focus area is formed at one or more intervals between top and bottom lines of the straight lines when a plurality of the straight lines are placed on the eyeglass lens; and
wherein an image outside the visual focus area is blurry, directing the user's attention to the image within the visual focus area.

2. The eyeglass lens of claim 1, wherein the one or more lines comprises at least one line arranged in a horizontal direction.

3. The eyeglass lens of claim 2, wherein the line arranged in the horizontal direction is formed to correspond to a slope formed by pupils of both eyes of the user facing forward.

4. Eyeglasses comprising: the eyeglass lens of claim 3; and, a temple coupled to the eyeglass lens and formed so as to be draped over a user's ear.

5. Eyeglasses comprising: the eyeglass lens of claim 2; and, a temple coupled to the eyeglass lens and formed so as to be draped over a user's ear.

6. The eyeglass lens of claim 1, wherein a width of the line is 1.5 mm to 4 mm.

7. The eyeglass lens of claim 6, wherein a distance between two adjacent lines among the lines is 1.5 mm to 3 mm.

8. Eyeglasses comprising: the eyeglass lens of claim 7; and, a temple coupled to the eyeglass lens and formed so as to be draped over a user's ear.

9. Eyeglasses comprising: the eyeglass lens of claim 6; and, a temple coupled to the eyeglass lens and formed so as to be draped over a user's ear.

10. The eyeglass lens of claim 1, wherein the line comprises at least one line vertically arranged on the eyeglass lens.

11. Eyeglasses comprising: the eyeglass lens of claim 10; and, a temple coupled to the eyeglass lens and formed so as to be draped over a user's ear.

12. The eyeglass lens of claim 1, wherein the line comprises at least one line diagonally arranged on the eyeglass lens.

13. Eyeglasses comprising: the eyeglass lens of claim 12; and, a temple coupled to the eyeglass lens and formed so as to be draped over a user's ear.

14. The eyeglass lens of claim 1, wherein the line is any one line selected from a group consisting of at least one horizontal line, at least one vertical line, and at least one diagonal line formed on the eyeglass lens, or a combination thereof.

15. Eyeglasses comprising: the eyeglass lens of claim 14; and, a temple coupled to the eyeglass lens and formed so as to be draped over a user's ear.

16. Eyeglasses, comprising: the eyeglass lens of claim 1; and, a temple coupled to the eyeglass lens and formed so as to be draped over a user's ear.

\*  \*  \*  \*  \*